US011685558B2

United States Patent
Pham et al.

(10) Patent No.: US 11,685,558 B2
(45) Date of Patent: Jun. 27, 2023

(54) MARKER BASED SMART LANDING PAD

(71) Applicant: Honeywell International Inc., Charlotte, NC (US)

(72) Inventors: Hai Pham, Eden Prairie, MN (US); Arjun Bindu Jyothikumar, Edina, MN (US); Thandava Krishna Edara, Plymouth, MN (US); Nikolas Pardoe, Minneapolis, MN (US); Samuel Elliott Fleishman, Minneapolis, MN (US); Moses Bangura, Osseo, MN (US); Mohan Pulikkottil Jacob, Bangalore (IN); Manik Jahagirdar, Edna, MN (US); Vijay Venkataraman, Excelsior, MN (US); Romi Srivastava, Lucknow (IN)

(73) Assignee: Honeywell International Inc., Charlotte, NC (US)

(*) Notice: Subject to any disclaimer, the term of this patent is extended or adjusted under 35 U.S.C. 154(b) by 266 days.

(21) Appl. No.: 17/212,685

(22) Filed: Mar. 25, 2021

(65) Prior Publication Data
US 2022/0242589 A1 Aug. 4, 2022

(51) Int. Cl.
*B64U 70/92* (2023.01)
*B64F 1/00* (2006.01)
(Continued)

(52) U.S. Cl.
CPC .............. *B64U 70/92* (2023.01); *B64F 1/007* (2013.01); *B64U 70/95* (2023.01); *B64F 1/20* (2013.01);
(Continued)

(58) Field of Classification Search
CPC .......... B64U 70/92; B64U 70/95; B64F 1/007
See application file for complete search history.

(56) References Cited

U.S. PATENT DOCUMENTS

| 10,254,767 B1 | 4/2019 | Kamon |
| 10,289,116 B1 | 5/2019 | Dunn et al. |

(Continued)

FOREIGN PATENT DOCUMENTS

| CN | 105843242 A | 8/2016 |
| EP | 3415427 A1 | 12/2018 |
| WO | 2018201704 A1 | 11/2018 |

OTHER PUBLICATIONS

Amazon.com, "Zhangli 110CM Drone Landing Pad for FIMI X8SE, Tello, Runner 250, DJIs, QAV250(Universal for Most of Drones)", at least as early as Dec. 18, 2020, pp. 1 through 7, Amazon.com.
(Continued)

*Primary Examiner* — Jessica B Wong
(74) *Attorney, Agent, or Firm* — Fogg & Powers LLC

(57) ABSTRACT

A smart landing pad comprises a flexible display that shows images or patterns, and a protective layer over the display. The protective layer allows a UAV to land without damaging the display. Locator and range finder devices, coupled to the display, communicate with the UAV. The display is operative for wireless communications with a computer or mobile device that provides on-demand user functions, allowing for dynamically changing or customizing the images/patterns shown on the display. The images/patterns comprise a background area showing changeable images that match an environment where the landing pad is placed, and a target landing area surrounded by the background area. The target landing area includes a changeable insensitive, contrast portion, and changeable marker pattern portions having changeable colors/shapes. The images/patterns also include changeable QR codes on the target landing area. The display is IoT enabled so that data from the landing pad is remotely cloud accessible.

20 Claims, 3 Drawing Sheets

(51) Int. Cl.
*B64U 70/95* (2023.01)
*B64F 1/20* (2006.01)
*G09G 5/02* (2006.01)
*G09G 5/37* (2006.01)
*G09G 3/00* (2006.01)
*B64U 10/13* (2023.01)
*G08G 5/02* (2006.01)

(52) U.S. Cl.
CPC .............. *B64U 10/13* (2023.01); *G08G 5/025* (2013.01); *G09G 3/035* (2020.08); *G09G 5/02* (2013.01); *G09G 5/37* (2013.01)

(56) References Cited

U.S. PATENT DOCUMENTS

| | | |
|---|---|---|
| 10,395,544 B1 | 8/2019 | Harris et al. |
| 10,434,885 B2 | 10/2019 | Antonini et al. |
| 10,713,958 B2 | 7/2020 | Hobbs et al. |
| 2015/0183528 A1 | 7/2015 | Walsh et al. |
| 2016/0122038 A1 | 5/2016 | Fleischman et al. |
| 2017/0015438 A1 | 1/2017 | Harding et al. |
| 2018/0053139 A1 | 2/2018 | Stoman |
| 2018/0265196 A1 | 9/2018 | Phillips et al. |
| 2020/0017237 A1 | 1/2020 | Walker |

OTHER PUBLICATIONS

Camera CY, "Drone Landing Pad, Universal Waterproof D 75cm/30", at least as early as Dec. 18, 2020, pp. 1 through 6, https://cameracy.com/product/drone-landing-pad-universal-waterproof-d-75cm-30/.

Ideal Supply Inc, "43" Drone Landing Pad With Reflective Stripes", at least as early as Dec. 18, 2020, pp. 1 through 3, https://www.idealblasting.com/43-drone-landing-pad-with-reflective-stripes/.

Lee, "Honeywell launches new business unit to capture drone market", Jun. 15, 2020, pp. 1 through 7, https://www.yahoo.com/news/honeywell-launches-business-unit-capture-120749486.html?guccounter=1.

European Patent Office, "Extended European Search Report from EP Application No. 22151188.4", from Foreign Counterpart to U.S. Appl. No. 17/212,685, filed May 31, 2022, pp. 1 through 8, Published: EP.

MARKER BASED SMART LANDING PAD

CROSS REFERENCE TO RELATED APPLICATION

This application claims the benefit of priority to Indian Application No. 202111004297, filed on Feb. 1, 2021, which is herein incorporated by reference.

BACKGROUND

The drone industry is rapidly growing, and drones such as urban air mobility (UAM) vehicles, unmanned aircraft systems (UAS), and other unmanned aerial vehicles (UAVs), have a need for technological improvements that provide for safe landings in case of an emergency.

In some cases, marker based landing (MBL) systems and pads are being used by various companies for drone deliveries. However, when these marker based landing systems and pads are used for emergency landings, the landing pad can be unrecognizable from the drone camera when it is dark, under shadow, or when the light is too bright.

SUMMARY

A smart landing pad comprises a flexible display including a display surface configured to show one or more images or patterns, and a protective layer over the display surface. The protective layer is configured to allow an unmanned aerial vehicle (UAV) to land on the smart landing pad without damaging the flexible display. One or more locator and range finder devices are operatively coupled to the flexible display and are operative to communicate with the UAV, such that the flexible display is self-locatable based on a three-dimensional location communicated to the UAV during a landing approach. One or more communication devices are operatively coupled to the flexible display and are operative for wireless communications with a computer or mobile computational device that is operative to provide on-demand user functions, which allow for dynamically changing or customizing in real time the one or more images or patterns that are shown on the display surface.

The one or more images or patterns comprise a background area configurable to show changeable images that match an environment where the smart landing pad is placed for use as a landing site for the UAV, and a target landing area that is surrounded by the background area. The target landing area includes: a changeable insensitive, contrast portion that allows the target landing area to be more recognizable from the UAV under bright light, in darkness at nighttime, or due to poor visibility from inclement weather or dusty environmental conditions; and one or more changeable marker pattern portions having changeable colors and/or shapes that provide for ease of pattern recognition from the UAV. The one or more images also include one or more changeable quick response (QR) codes on the target landing area, with the one or more QR codes operative as fiducial points or for communications. The flexible display is Internet of things (IoT) enabled so that data from the smart landing pad is remotely cloud accessible, allowing the data to be changed, logged, or processed.

BRIEF DESCRIPTION OF THE DRAWINGS

Features of the present disclosure will be apparent to those skilled in the art from the following description with reference to the drawings. Understanding that the drawings depict only typical embodiments and are not therefore to be considered limiting in scope, the embodiments will be described with additional specificity and detail through the use of the drawings, in which.

DETAILED DESCRIPTION

In the following detailed description, reference is made to the accompanying drawings, in which is shown by way of illustration various exemplary embodiments. It is to be understood that other embodiments may be utilized. The following detailed description is, therefore, not to be taken in a limiting sense.

A marker based, smart landing pad system and method are described herein. The smart landing pad system is useful for the landing of an unmanned aerial vehicle (UAV), including various drones, such as urban air mobility (UAM) vehicles, unmanned aircraft systems (UAS), and the like.

In one embodiment, a smart landing pad for marker based landing of a UAV includes a flexible display, which is drivable by a computer or mobile computational device in operative communication with the flexible display through one or more communication devices operatively coupled to the flexible display. This provides for on demand user functions, which allow for dynamically changing or customizing in real time what is shown on the flexible display. For example, a user can provide on demand changes to various images or patterns shown on the flexible display, such as quick response (QR) codes, landing surface properties, as well as display intensity according to the exposure setting of UAV onboard cameras, and a backlighted display screen so the UAV can recognize the smart landing pad at nighttime. The QR codes are on demand changeable for fiducial-based navigation and communication purposes.

In addition, one or more locator and range finder devices are operatively coupled to the flexible display and are configured to communicate with a UAV, such that the flexible display is self-locatable based on a three-dimensional location communicated to the UAV during a landing approach. For example, a laser range finder embedded in the flexible display can be used to detect latitude/longitude/altitude (LLA), angle, and distance from the smart landing pad to the UAV. The distance can be used as an altitude from the UAV to the landing surface, and data from the laser range finder can be relayed to the UAV via a long range (LoRa) radio coupled to the flexible display.

The smart landing pad can also be Internet of Things (IoT) enabled, such that data from the smart landing pad is remotely cloud accessible by a user. For example, the flexible display can be embedded with a cloud connection such that the smart landing pad is IoT enabled. This allows a user to remotely monitor or control the functions of the smart landing pad over the cloud connection.

Further details of various embodiments are described hereafter with reference to the drawings.

Figure 1:
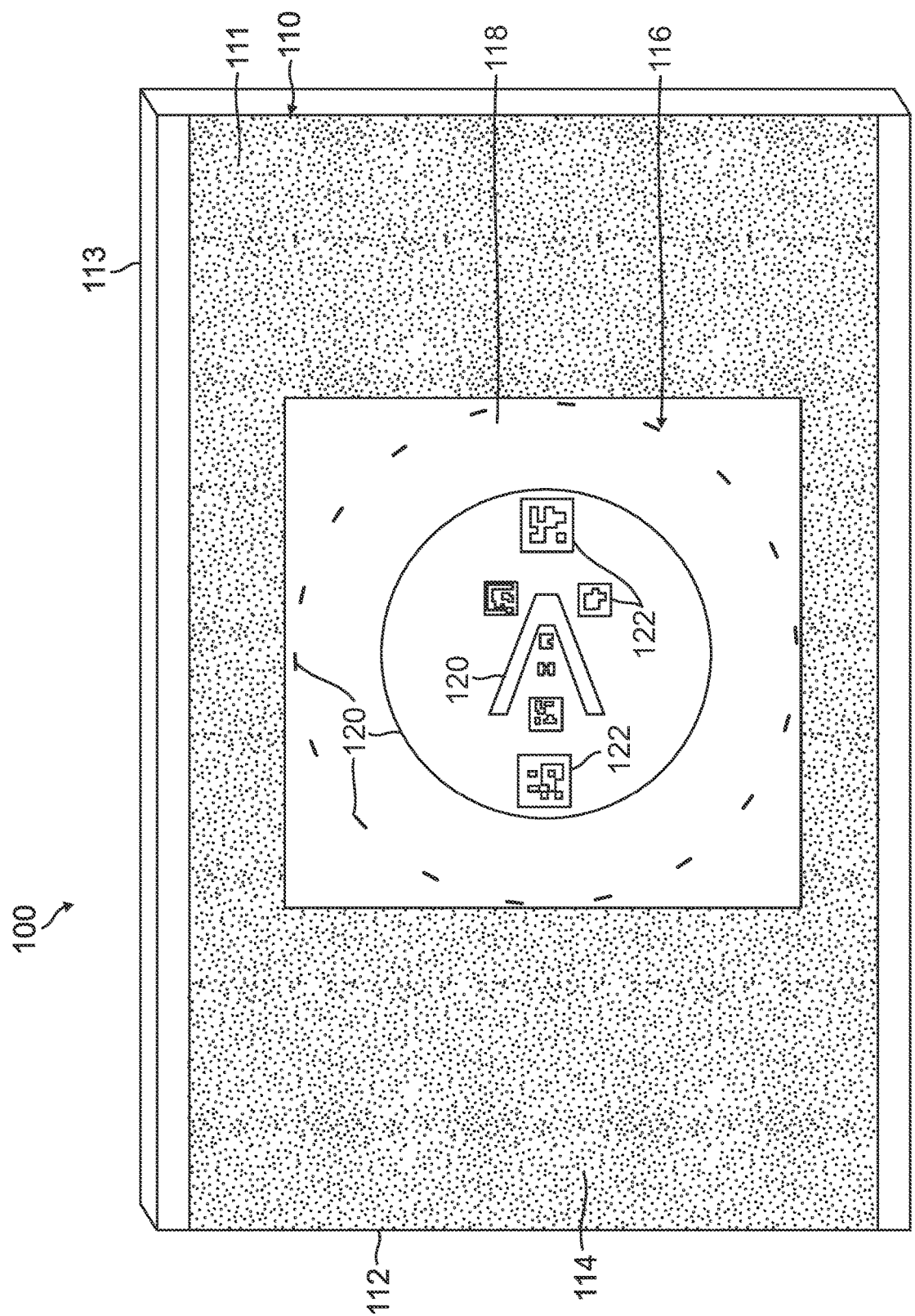
FIG. 1 illustrates a marker based smart landing pad, according to one embodiment.

FIG. 1 illustrates a marker based smart landing pad 100, according to one embodiment. The smart landing pad 100 includes a flexible display 110 having a display surface 111 (screen) configured to show one or more images or patterns.

A protective layer 112 is formed over display surface 111. In addition, flexible display 110 can be mounted on a flexible backing layer 113.

In example embodiments, flexible display 110 can be rollable, conformable, foldable, or shapeable. For example, flexible display 110 can be a flexible organic liquid crystal display (OLCD) display, a flexible organic light emitting diode (OLED) display, or the like.

The protective top surface 112 can be a layer of coated hard material, such as a layer of tempered glass or an acrylic sheet (e.g., plexiglass). The protective top surface 112 allows a UAV to safely land on smart landing pad 100 without damaging flexible display 100. The protective top surface 112 is also configured to be water and dust resistant.

The flexible backing layer 113 can be composed of flexible polymer material, for example. The flexible backing layer 113 provides protection for flexible display 110 when placed on the ground where a UAV is to land.

The smart landing pad 100 is configured to allow for on demand changes to what is shown on flexible display 110. For example, flexible display 110 has a changeable background area 114 that is configured to show various background images. These images can be tailored to match the actual environment where smart landing pad 100 is placed for use as a landing site for a UAV. Nonlimiting examples of images that can be shown in background area 114 include images of sand, gravel, loose rock, grasses, concrete, or the like.

The flexible display 110 also has a target landing area 116 that is surrounded by background area 114. The target landing area 116 has a changeable insensitive, contrast portion 118 that makes target landing area 116 more recognizable from the UAV under bright light, in the dark at nighttime, or due to poor visibility from inclement weather or dusty environmental conditions.

The target landing area 116 also has changeable marker pattern portions 120, whose color and/or shape can be changed to provide for ease of object/pattern recognition from the UAV. For example, while target area 116 is shown with circular marker boundary lines (solid and dashed) and a central target marker ("V" shape), these can be changed to other geometric shapes or patterns as desired. The target landing area 116 also is configured to display one or more changeable quick response (QR) codes 122, which serve as fiducial points or for communication purposes.

The smart landing pad 100 can also include one or wireless communication devices, which provide short range and/or cloud communications with a computer or mobile computational device. This allows for on-demand user functions, which allow for dynamically changing or customizing in real time what is shown on flexible display 110. The smart landing pad can also include one or more locator, range finder, and long range communication devices, which operatively communicate with a UAV for landing purposes. Examples of such devices are described in further detail hereafter.

Figure 2:
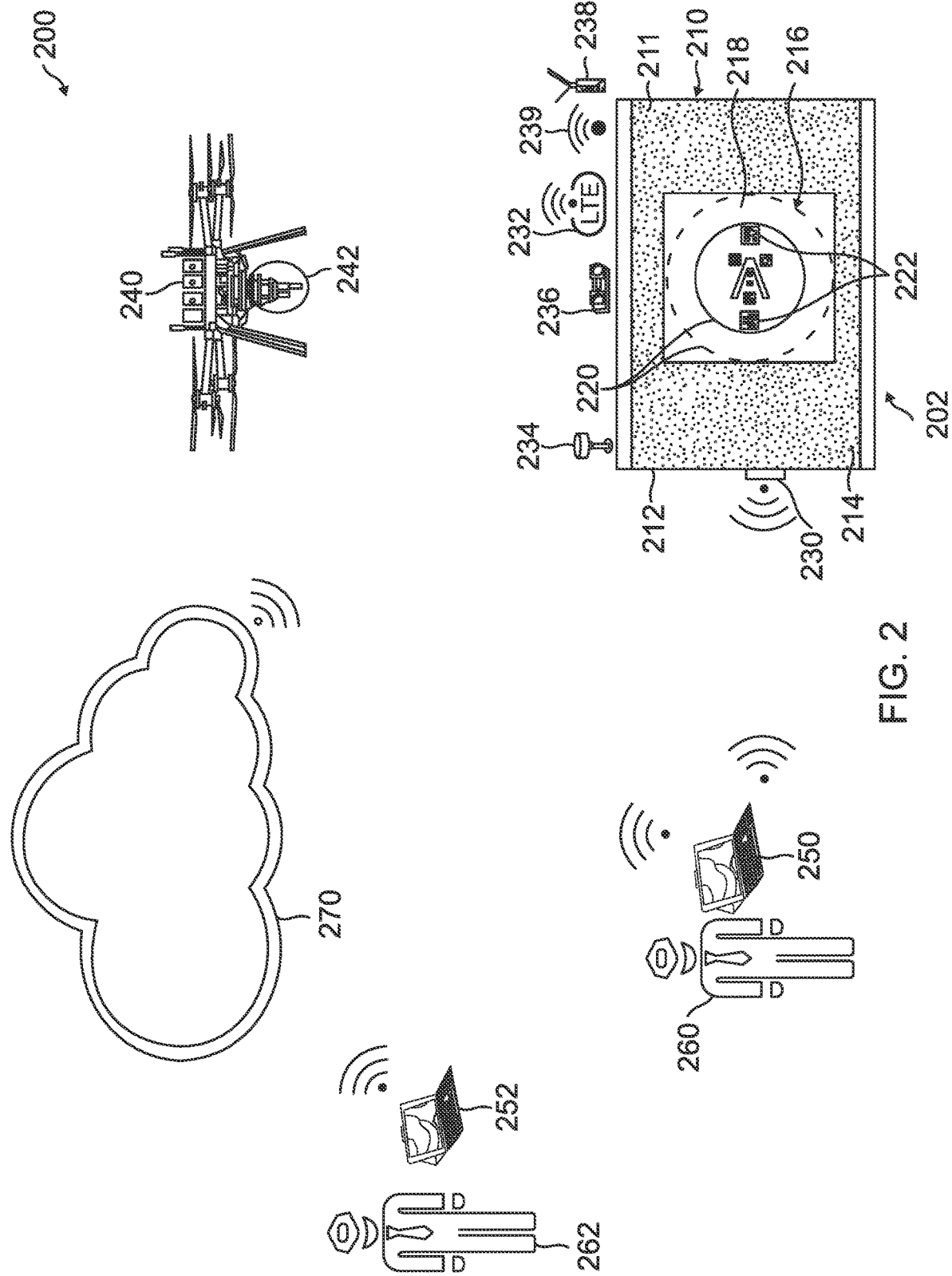
FIG. 2 illustrates an exemplary system implementation for a marker based smart landing pad.

FIG. 2 illustrates an exemplary system 200 for implementing use of a marker based smart landing pad 202, which includes features similar to those described above for smart landing pad 100. Accordingly, smart landing pad 202 includes a flexible display 210 having a display surface 211 configured to show one or more images or patterns. A protective layer 212 is formed over display surface 211. In addition, flexible display 210 can be mounted on a flexible backing layer.

The flexible display 210 can be rollable, conformable, foldable, or shapeable. For example, flexible display 210 can be a flexible OLCD display, a flexible OLED display, or the like. The protective layer 212 can be a layer of coated hard material, and is configured such that a UAV 240 is able to safely land on smart landing pad 202 without damaging flexible display 210.

The smart landing pad 202 is configured to allow for on demand changes to what is shown on flexible display 210. For example, flexible display 210 has a changeable background area 214 that is configured to show various background images, which can be tailored to match the actual environment where smart landing pad 202 is placed for use as a landing site for UAV 240. The flexible display 210 also has a target landing area 216 that is surrounded by background area 214. The target landing area 216 has a changeable insensitive, contrast portion 218 that makes target landing area 216 more recognizable from UAV 240 under bright light or in the dark at nighttime.

The target landing area 216 also has changeable marker pattern portions 220, whose color and/or shape can be changed to provide for ease of object/pattern recognition from UAV 240. The target landing area 216 also is configured to display one or more changeable QR codes 222, which serve as fiducial points or for communication purposes. For example, QR codes 222 can have special meanings that are defined by the operation, such as suggested UAV camera exposure settings, slope of the landing surface, condition of the landing surface, type of landing surface, good to land, abort landing process, or the like.

The smart landing pad 202 also includes one or wireless communication devices, which provide for short range and/or cloud communications with a computer or mobile computational device operated by a user. For example, flexible display 210 can be embedded with a short range device 230, which provides for short range communications (e.g., WiFi, Bluetooth) with a computer 250 such as a laptop, or with a mobile computational device such as a smartphone, operated by a user 260. The computer 250 (or mobile computational device) is operative to provide on demand user functions, which allow user 260 to dynamically change or customize in real time what is shown on flexible display 210.

In addition, flexible display 210 can be Internet of Things (IoT) enabled, such that data from smart landing pad 202 is remotely cloud accessible. This allows smart landing pad 202 to be remotely monitored or controlled over a cloud connection. For example, a remote cloud server can be used to log and store landing data for auditing purposes or future data analysis. In addition, the cloud connection can be used to provide weather condition data, wind speed data, and the like to the descending UAV through communications with the smart landing pad, as well as go/no go decisions for landing the UAV.

In one embodiment, a Long Term Evolution (LTE) cloud connection 232 can be embedded in flexible display 210 to IoT enable smart landing pad 202. This allows data to be changed, logged, or processed, such as from a remote location. For example, a remote user 262 in a supervisory capacity can manually override a landing situation for smart landing pad 202 using a computer 252 (or mobile computational device) over a cloud connection 270.

The smart landing pad 202 also includes one or more locator, range finder, and long range communication devices, which operatively communicate with UAV 240 for landing purposes. These devices allow smart landing pad 202 to be self-locatable based on a three-dimensional location communicated to UAV 240, so that UAV 240 can successfully land on target landing area 216.

For example, flexible display 210 can have an embedded a Global Navigation Satellite System (GNSS) device, such as a Global Positioning System (GPS) device 234 or other locator device, which provides latitude/longitude/altitude (LLA) data for self-locating purposes. The flexible display 210 can also have an embedded laser range finder 236 to detect the proximity of UAV 240 during its descent toward smart landing pad 202.

In addition, a long range (LoRa) communication and ranging device 238 can be embedded in flexible display 210 to provide distance measurements to determine the proximity and altitude from UAV 240 to smart landing pad 202. The LoRa is a low-power wide-area network (LPWAN) protocol, which can be implemented with LoRa enabled devices. For example, a LoRa radio with a ranging engine can be used as a distance finder. The distances measured by the range finders are used by the UAV to confirm accuracy for landing purposes.

A proprietary data communication channel 239 can be provided that relays the location data of smart landing pad 202 to UAV 240. The location data can be used to provide the coordinates for landing of UAV 240 on smart landing pad 202.

The UAV 240 includes a sensor payload 242, which allows UAV 240 to track and communicate with smart landing pad 202. For example, sensor payload 242 can include image capturing devices (cameras), a laser range sensor, a proximity sensor, a LoRa and time of flight (ToF) range sensing device, and the like.

Figure 3:
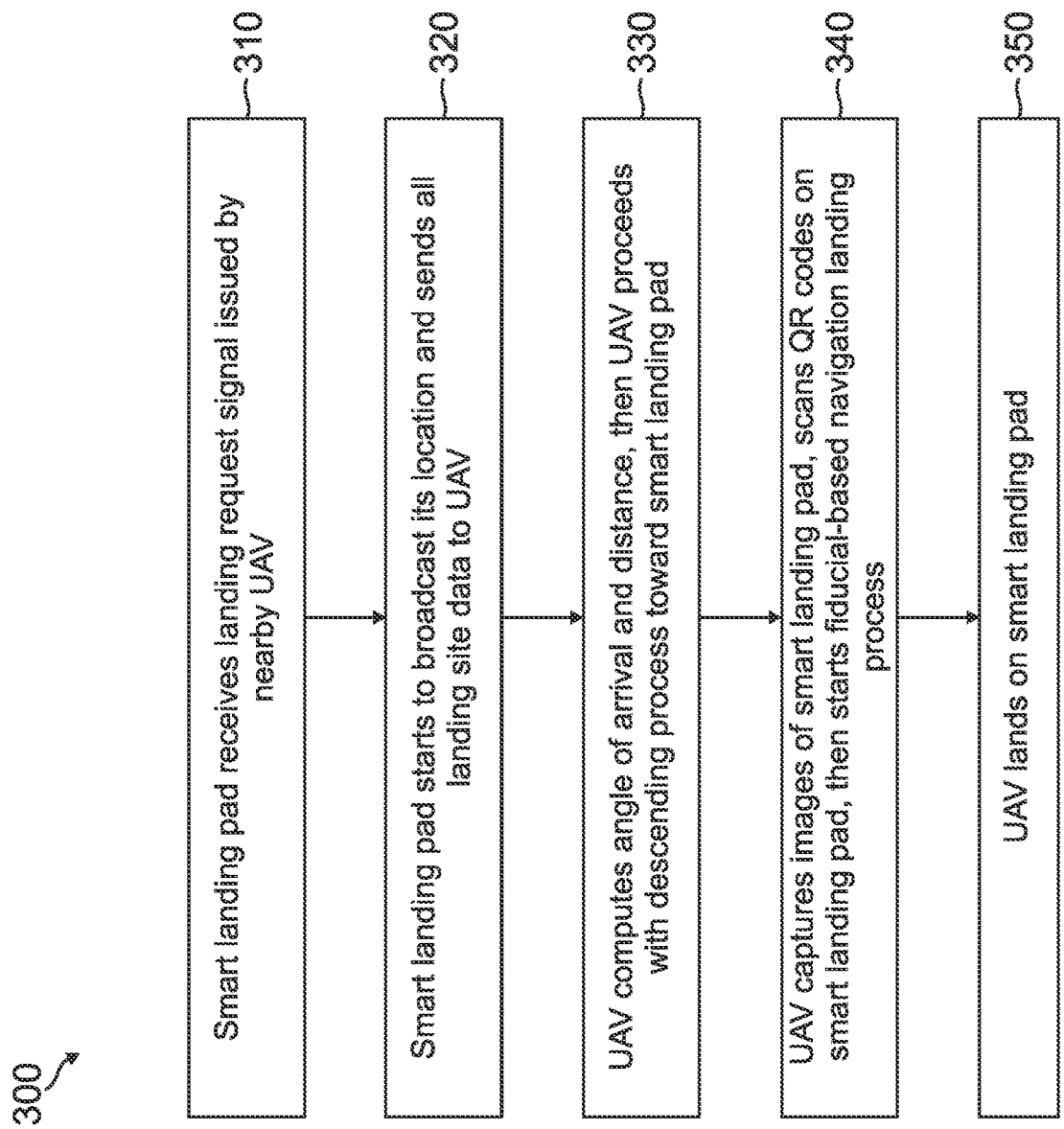
FIG. 3 is a flow diagram for a method of using a marker based smart landing pad.

FIG. 3 is a flow diagram for a method 300 of using a marker based smart landing pad, such as those described above. Initially, a smart landing pad, placed at a given location, receives a landing request signal issued by a nearby UAV (block 310). The smart landing pad then starts to broadcast its location and send all landing site data to the UAV (block 320). The UAV computes the angle of arrival and distance to the smart landing pad, based on the received landing site location and data, and the UAV then proceeds with the descending process toward the smart landing pad (block 330). The UAV captures images of the smart landing pad, scans QR codes shown on the display surface of the smart landing pad, and then starts a fiducial-based navigation landing process (block 340). The UAV then lands on the smart landing pad (block 350).

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a smart landing pad, comprising: a flexible display including a display surface configured to show one or more images or patterns; a protective layer over the display surface, wherein the protective layer is configured to allow an unmanned aerial vehicle (UAV) to land on the smart landing pad without damaging the flexible display; one or more locator and range finder devices operatively coupled to the flexible display and operative to communicate with the UAV, such that the flexible display is self-locatable based on a three-dimensional location communicated to the UAV during a landing approach; and one or more communication devices operatively coupled to the flexible display and operative for wireless communications with a computer or mobile computational device that is operative to provide on-demand user functions, which allow for dynamically changing or customizing in real time the one or more images or patterns that are shown on the display surface; wherein the one or more images or patterns comprise: a background area configurable to show changeable images that match an environment where the smart landing pad is placed for use as a landing site for the UAV; a target landing area that is surrounded by the background area, the target landing area including: a changeable insensitive, contrast portion that allows the target landing area to be more recognizable from the UAV under bright light, in darkness at nighttime, or due to poor visibility from inclement weather or dusty environmental conditions; and one or more changeable marker pattern portions having changeable colors and/or shapes that provide for ease of pattern recognition from the UAV; and one or more changeable quick response (QR) codes on the target landing area, the one or more QR codes operative as fiducial points or for communications; wherein the flexible display is Internet of things (IoT) enabled so that data from the smart landing pad is remotely cloud accessible, allowing the data to be changed, logged, or processed.

Example 2 includes the smart landing pad of Example 1, wherein the flexible display is rollable, conformable, foldable, or shapeable.

Example 3 includes the smart landing pad of any of Examples 1-2, wherein the flexible display comprises a flexible organic liquid crystal display (OLCD) display, or a flexible organic light emitting diode (OLED) display.

Example 4 includes the smart landing pad of any of Examples 1-3, wherein the protective layer is configured to be water resistant and dust resistant.

Example 5 includes the smart landing pad of any of Examples 1-4, wherein the protective layer comprises a coated hard material.

Example 6 includes the smart landing pad of any of Examples 1-5, wherein the protective layer comprises a layer of tempered glass or an acrylic sheet.

Example 7 includes the smart landing pad of any of Examples 1-6, wherein the flexible display is mounted on a flexible backing layer, which is configured to provide protection for the flexible display when placed on the ground where the UAV is to land.

Example 8 includes the smart landing pad of Example 7, wherein the flexible backing layer comprises a flexible polymer material.

Example 9 includes the smart landing pad of any of Examples 1-8, wherein the one or more locator and range finder devices are embedded in the flexible display and comprise: a Global Navigation Satellite System (GNSS) device operative to provide latitude/longitude/altitude (LLA) data for the flexible display when placed at a landing site; a laser range finder operative to detect a proximity of the UAV with respect to the flexible display during a descent of the UAV toward the landing site; and a long range (LoRa) communication and ranging device embedded in the flexible display and operative to provide distance measurements to determine a proximity and altitude from the UAV to the flexible display during a descent of the UAV toward the landing site.

Example 10 includes the smart landing pad of any of Examples 1-9, wherein the one or more communication devices are embedded in the flexible display and comprise: a short range device configured to provide a WiFi connection or a Bluetooth connection; and a cloud connection device configured to provide a Long Term Evolution (LTE) cloud connection.

Example 11 includes the smart landing pad of any of Examples 1-10, wherein the flexible display is configured with a proprietary data communication channel that is operative to relay location data of the smart landing pad to the UAV.

Example 12 includes a method comprising: placing a smart landing pad at a landing site location for an unmanned aerial vehicle (UAV), the smart landing pad comprising: a flexible display including a display surface configured to show one or more images or patterns; one or more locator and range finder devices operatively coupled to the flexible display and operative to communicate with the UAV; and one or more communication devices operatively coupled to the flexible display and operative for wireless communications with a computer or mobile computational device that is operative to provide on-demand user functions, which allow for dynamically changing or customizing in real time the one or more images or patterns that are shown on the display surface; wherein the flexible display is Internet of things (IoT) enabled so that data from the smart landing pad is remotely cloud accessible; receiving, at the smart landing pad, a landing request signal issued by the UAV; broadcasting the landing site location and data from the smart landing pad to the UAV; computing, in the UAV, an angle of arrival and distance to the smart landing pad based on the landing site location and data; and initiating a descent process of the UAV toward the smart landing pad during which the UAV captures images of the smart landing pad, scans quick response (QR) codes shown on the display surface, and begins a fiducial-based navigation landing process for landing the UAV on the smart landing pad.

Example 13 includes the method of Example 12, wherein the UAV includes a sensor payload configured to allow the UAV to track and communicate with the smart landing pad.

Example 14 includes the method of Example 13, wherein the sensor payload comprises one or more of an image capturing device, a laser range sensor, a proximity sensor, or a long range (LoRa) and time of flight (ToF) range sensing device.

Example 15 includes the method of any of Examples 12-14, wherein the one or more images or patterns comprise: a background area configurable to show changeable images that match an environment where the smart landing pad is placed; a target landing area that is surrounded by the background area, the target landing area including: a changeable insensitive, contrast portion that allows the target landing area to be more recognizable from the UAV under bright light, in darkness at nighttime, or due to poor visibility from inclement weather or dusty environmental conditions; and one or more changeable marker pattern portions having changeable colors and/or shapes that provide for ease of pattern recognition from the UAV; and the one or more QR codes are shown on the target landing area.

Example 16 includes the method of any of Examples 12-15, wherein the flexible display comprises a flexible organic liquid crystal display (OLCD) display, or a flexible organic light emitting diode (OLED) display.

Example 17 includes the method of any of Examples 12-16, wherein the smart landing pad further comprises: a protective layer over the display surface, wherein the protective layer is configured to allow the UAV to land on the smart landing pad without damaging the flexible display.

Example 18 includes the method of any of Examples 12-17, wherein the one or more locator and range finder devices are embedded in the flexible display and comprise: a Global Navigation Satellite System (GNSS) device operative to provide latitude/longitude/altitude (LLA) data for the flexible display placed at the landing site location; a laser range finder operative to detect a proximity of the UAV with respect to the flexible display during the descent process of the UAV; and a long range (LoRa) communication and ranging device operative to provide distance measurements to determine a proximity and altitude from the UAV to the flexible display during the descent process of the UAV.

Example 19 includes the method of any of Examples 12-18, wherein the one or more communication devices are embedded in the flexible display and comprise: a short range device configured to provide a WiFi connection or a Bluetooth connection; and a cloud connection device configured to provide a Long Term Evolution (LTE) cloud connection.

Example 20 includes the method of any of Examples 12-19, wherein a proprietary data communication channel broadcasts the landing site location and data from the smart landing pad to the UAV.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:
1. A smart landing pad, comprising:
a flexible display including a display surface configured to show one or more images or patterns;
a protective layer over the display surface, wherein the protective layer is configured to allow an unmanned aerial vehicle (UAV) to land on the smart landing pad without damaging the flexible display;

one or more locator and range finder devices operatively coupled to the flexible display and operative to communicate with the UAV, such that the flexible display is self-locatable based on a three-dimensional location communicated to the UAV during a landing approach; and one or more communication devices operatively coupled to the flexible display and operative for wireless communications with a computer or mobile computational device that is operative to provide on-demand user functions, which allow for dynamically changing or customizing in real time the one or more images or patterns that are shown on the display surface;

wherein the one or more images or patterns comprise:
  a background area configurable to show changeable images that match an environment where the smart landing pad is placed for use as a landing site for the UAV;
  a target landing area that is surrounded by the background area, the target landing area including:
    a changeable insensitive, contrast portion that allows the target landing area to be more recognizable from the UAV under bright light, in darkness at nighttime, or due to poor visibility from inclement weather or dusty environmental conditions; and
    one or more changeable marker pattern portions having changeable colors and/or shapes that provide for ease of pattern recognition from the UAV; and
  one or more changeable quick response (QR) codes on the target landing area, the one or more QR codes operative as fiducial points or for communications;
wherein the flexible display is Internet of things (IoT) enabled so that data from the smart landing pad is remotely cloud accessible, allowing the data to be changed, logged, or processed.

2. The smart landing pad of claim 1, wherein the flexible display is rollable, conformable, foldable, or shapeable.

3. The smart landing pad of claim 1, wherein the flexible display comprises a flexible organic liquid crystal display (OLCD) display, or a flexible organic light emitting diode (OLED) display.

4. The smart landing pad of claim 1, wherein the protective layer is configured to be water resistant and dust resistant.

5. The smart landing pad of claim 1, wherein the protective layer comprises a coated hard material.

6. The smart landing pad of claim 1, wherein the protective layer comprises a layer of tempered glass or an acrylic sheet.

7. The smart landing pad of claim 1, wherein the flexible display is mounted on a flexible backing layer, which is configured to provide protection for the flexible display when placed on the ground where the UAV is to land.

8. The smart landing pad of claim 1, wherein the flexible backing layer comprises a flexible polymer material.

9. The smart landing pad of claim 1, wherein the one or more locator and range finder devices are embedded in the flexible display and comprise:
  a Global Navigation Satellite System (GNSS) device operative to provide latitude/longitude/altitude (LLA) data for the flexible display when placed at a landing site;
  a laser range finder operative to detect a proximity of the UAV with respect to the flexible display during a descent of the UAV toward the landing site; and
  a long range (LoRa) communication and ranging device embedded in the flexible display and operative to provide distance measurements to determine a proximity and altitude from the UAV to the flexible display during a descent of the UAV toward the landing site.

10. The smart landing pad of claim 1, wherein the one or more communication devices are embedded in the flexible display and comprise:
  a short range device configured to provide a WiFi connection or a Bluetooth connection; and
  a cloud connection device configured to provide a Long Term Evolution (LTE) cloud connection.

11. The smart landing pad of claim 1, wherein the flexible display is configured with a proprietary data communication channel that is operative to relay location data of the smart landing pad to the UAV.

12. A method comprising:
  placing a smart landing pad at a landing site location for an unmanned aerial vehicle (UAV), the smart landing pad comprising:
    a flexible display including a display surface configured to show one or more images or patterns;
    one or more locator and range finder devices operatively coupled to the flexible display and operative to communicate with the UAV; and
    one or more communication devices operatively coupled to the flexible display and operative for wireless communications with a computer or mobile computational device that is operative to provide on-demand user functions, which allow for dynamically changing or customizing in real time the one or more images or patterns that are shown on the display surface;
  wherein the flexible display is Internet of things (IoT) enabled so that data from the smart landing pad is remotely cloud accessible; receiving, at the smart landing pad, a landing request signal issued by the UAV;
  broadcasting the landing site location and data from the smart landing pad to the UAV;
  computing, in the UAV, an angle of arrival and distance to the smart landing pad based on the landing site location and data; and
  initiating a descent process of the UAV toward the smart landing pad during which the UAV captures images of the smart landing pad, scans quick response (QR) codes shown on the display surface, and begins a fiducial-based navigation landing process for landing the UAV on the smart landing pad.

13. The method of claim 12, wherein the UAV includes a sensor payload configured to allow the UAV to track and communicate with the smart landing pad.

14. The method of claim 13, wherein the sensor payload comprises one or more of an image capturing device, a laser range sensor, a proximity sensor, or a long range (LoRa) and time of flight (ToF) range sensing device.

15. The method of claim 12, wherein the one or more images or patterns comprise:
  a background area configurable to show changeable images that match an environment where the smart landing pad is placed;
  a target landing area that is surrounded by the background area, the target landing area including:
    a changeable insensitive, contrast portion that allows the target landing area to be more recognizable from the UAV under bright light, in darkness at nighttime, or due to poor visibility from inclement weather or dusty environmental conditions; and one or more changeable marker pattern portions having changeable colors and/or shapes that provide for ease of pattern recognition from the UAV; and the one or more QR codes are shown on the target landing area.

16. The method of claim 12, wherein the flexible display comprises a flexible organic liquid crystal display (OLCD) display, or a flexible organic light emitting diode (OLED) display.

17. The method of claim 12, wherein the smart landing pad further comprises:

a protective layer over the display surface, wherein the protective layer is configured to allow the UAV to land on the smart landing pad without damaging the flexible display.

18. The method of claim 12, wherein the one or more locator and range finder devices are embedded in the flexible display and comprise:

a Global Navigation Satellite System (GNSS) device operative to provide latitude/longitude/altitude (LLA) data for the flexible display placed at the landing site location;

a laser range finder operative to detect a proximity of the UAV with respect to the flexible display during the descent process of the UAV; and a long range (LoRa) communication and ranging device operative to provide distance measurements to determine a proximity and altitude from the UAV to the flexible display during the descent process of the UAV.

19. The method of claim 12, wherein the one or more communication devices are embedded in the flexible display and comprise:

a short range device configured to provide a WiFi connection or a Bluetooth connection; and a cloud connection device configured to provide a Long Term Evolution (LTE) cloud connection.

20. The method of claim 12, wherein a proprietary data communication channel broadcasts the landing site location and data from the smart landing pad to the UAV.

* * * * *

UNITED STATES PATENT AND TRADEMARK OFFICE
CERTIFICATE OF CORRECTION

PATENT NO. : 11,685,558 B2
APPLICATION NO. : 17/212685
DATED : June 27, 2023
INVENTOR(S) : Pham et al.

Page 1 of 1

It is certified that error appears in the above-identified patent and that said Letters Patent is hereby corrected as shown below:

On the Title Page

Item (30), please add:
Foreign Application Priority Data
February 1, 2021 (IN) ............................ 202111004297

Signed and Sealed this
Third Day of September, 2024

Katherine Kelly Vidal
*Director of the United States Patent and Trademark Office*